United States Patent [19]

Watts et al.

[11] 4,267,612
[45] May 19, 1981

[54] BEEHIVES

[76] Inventors: Arthur E. Watts, Oakley House, Buckthorn Oak, Farnham, Surrey; Alfred E. A. Green, Morris Lodge Hotel, Frensham Rd., Lower Bourne, Furnham, Surry, both of England

[21] Appl. No.: 114,564

[22] Filed: Jan. 23, 1980

Related U.S. Application Data

[63] Continuation of Ser. No. 878,463, Feb. 16, 1978, abandoned.

[30] Foreign Application Priority Data

Feb. 17, 1977 [GB] United Kingdom ............... 6642/77

[51] Int. Cl.³ ............................................. A01K 47/06
[52] U.S. Cl. ....................................................... 6/4 B
[58] Field of Search ............................ 6/4 A, 4 B, 4 R

[56] References Cited

U.S. PATENT DOCUMENTS

| 473,284 | 4/1892 | Ashworth | 6/4 B |
| 522,772 | 7/1894 | Aikin et al. | 6/4 A |
| 1,100,847 | 6/1914 | Schamu | 6/4 A |

FOREIGN PATENT DOCUMENTS

| 643118 | 9/1950 | United Kingdom | 6/4 B |
| 679240 | 9/1952 | United Kingdom | 6/4 B |

Primary Examiner—Gene Mancene
Assistant Examiner—Robert P. Swiatek
Attorney, Agent, or Firm—Sherman & Shalloway

[57] ABSTRACT

A clearer board for a beehive comprises a shallow box-like structure having a top wall member which extends across the box and from the front wall towards the rear wall and a bottom wall member which extends across the box and from rear wall towards the front wall, the top and bottom wall members overlapping to form a tunnel between bee accesses in the top and bottom of the box. A gate in the form of an elongate resilient strip is pivotally mounted across the box in the tunnel and an external lever is provided to enable a user to operate the gate to allow bees to pass in either direction through the tunnel or to pass in only one direction as required. A beehive embodying such a clearer board is also disclosed.

24 Claims, 4 Drawing Figures

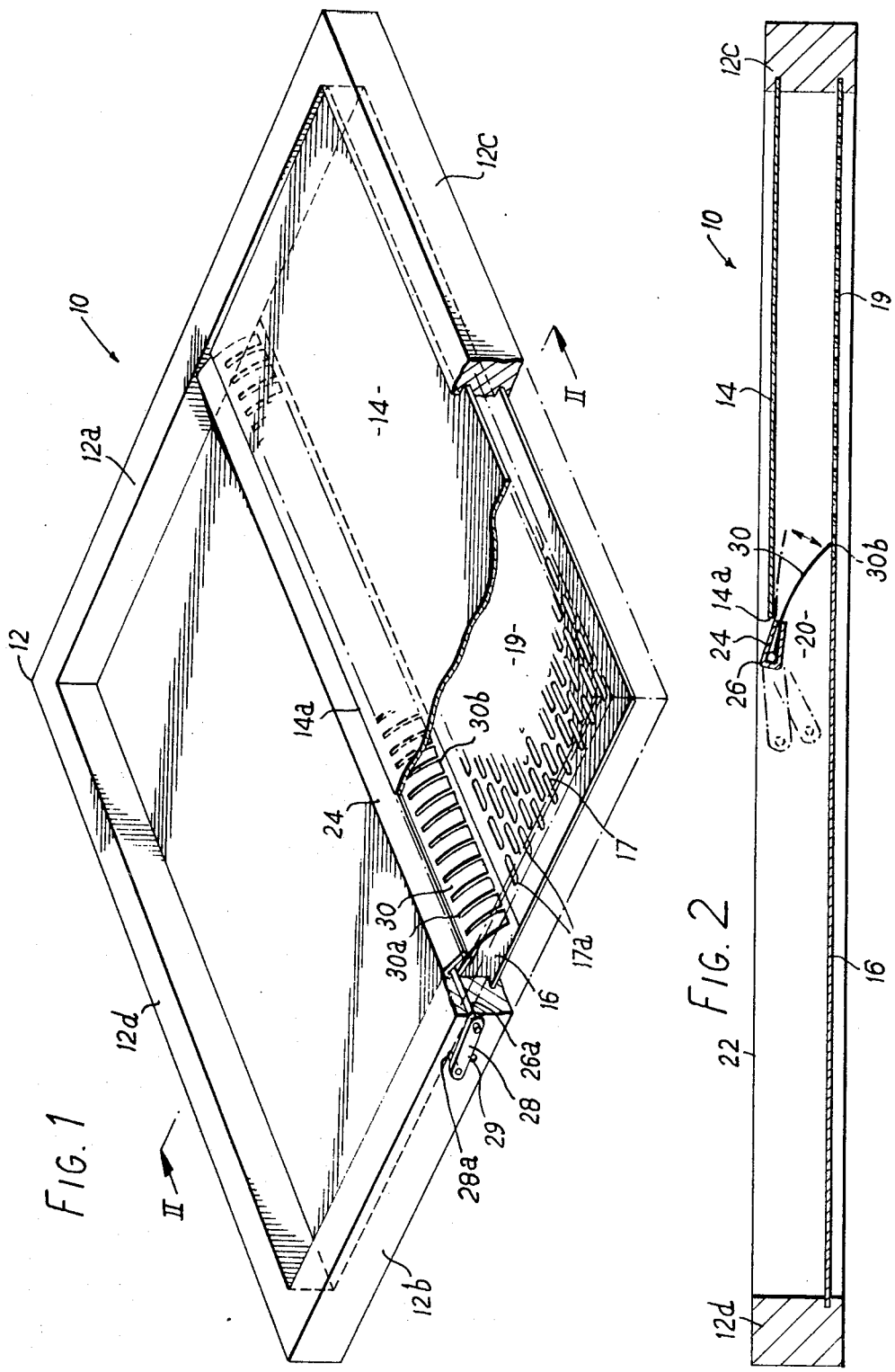

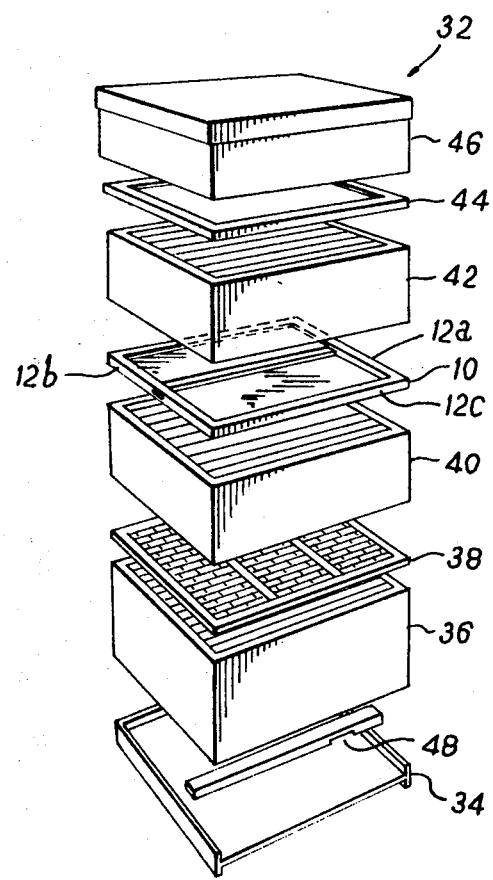

BEEHIVES

This is a continuation of application Ser. No. 878,463, filed Feb. 16, 1978, now abandoned.

BACKGROUND OF THE INVENTION

This invention relates to Beehives and to clearer boards for use therein.

DISCUSSION OF THE PRIOR ART

A typical beehive comprises a plurality of substantially square or rectangular boxes, each open at the top and bottom, mounted one above the other on a floor member. A crown board is placed over the topmost box and finally a roof is placed over the crown board to protect the hive. An entrance for the bees is provided between the lowermost box and the floor to allow entry to and exit from the hive.

Inside each box wooden frames, each supporting a sheet of wax foundation, are hung parallel to each other on which the bees construct their combs.

The lowermost box, which is generally larger than the other box or boxes, is called a brood chamber as the queen is confined thereto and is prevented from passing into the higher box or boxes, called shallow boxes or supers, by a queen excluder in the form of an apertured plate or a matrix of wires wherein the gaps are large enough to allow the worker bees to pass through but too small for the queen.

The supers are used by the bees for the storage of honey and periodically it is necessary for the beekeeper to remove the supers in order to extract the honey from the combs on the frames mounted therein. To facilitate this, the keeper must first remove the bees from the supers and a conventional method involves the use of a clearer board.

A clearer board is a board which is inserted under the super or group of supers from which it is required to remove the bees and has, in effect, a one-way gate which allows bees in the super to pass down and out of the super but prevents bees from returning into the super. One generally used gate, or bee escape comprises an aperture in the clearer board and a generally U-shaped member mounted on the underside of the clearer board to form a tunnel in communication with the aperture. Mounted in the tunnel are two strips of a resilient material which converge in the directions towards the two ends of the tunnel so that a bee can pass down through the aperture into the tunnel and then out through an end of the tunnel along a passage-way having converging walls. However, the spacing between the ends of the walls at the tunnel exit is such as to prevent a bee entering the tunnel and passing along and up through the aperture in the clearer board.

Such a clearer board is effective but it does have some disadvantages. For example access to the exit is limited and the bees may block one or more of the escapes so that it takes some time to clear the bees from the super, typically about two days.

SUMMARY OF THE INVENTION

According to a first aspect of the invention there is provided a bee escape comprising a shallow box having opposed first and second side walls joined at or near one end by a third side wall, a first cover member extending between corresponding first edges of the side walls and from the third wall and a second cover member extending between corresponding first portions of the second edges of said first and second walls and spaced from the third wall to define a tunnel between the internal surfaces of the overlapping parts of said cover members and said first and second side walls, the tunnel communicating at one end with a first bee access and at the other end with a second bee access and gate means having a first operative position wherein bees can move in either direction between the first and second accesses through the tunnel and a second operative position wherein bees can move in only one direction between the first and second access.

The first bee access may be an aperture bounded by the other ends of said first and second wall members and corresponding edges of the first and second cover members remote from said third wall member.

The second access may be an aperture bounded by the third wall and the edge of the second cover member facing the third wall and corresponding portions of the second edges of said first and second walls between the second cover member and the third wall.

In one embodiment of the invention, the first and second side walls may be joined at their other ends by a fourth wall in which case the edge of the first cover member remote from the third wall is spaced from said fourth wall and the edge of the second cover member remote from the third wall is secured to said fourth wall. In this case the shallow box can be dimensioned to act as a clearer board.

In another embodiment, the three sided shallow box may be arranged to fit into a larger box having four sides and a base with an aperture formed therein as an extension of the second bee access, the arrangement forming a clearer board. According to a second aspect of the invention there is provided a bee escape comprising a shallow box-like structure having opposed first and second side walls joined by opposed third and fourth walls.

a first cover member extending between corresponding portions of said first and second walls and from the third wall towards the fourth wall, a second cover member extending between corresponding portions of said first and second walls and from the fourth wall towards the third wall, the cover members being arranged in spaced relation with portions including their free edges overlapping to define a tunnel between the internal surfaces of the overlapping portions of the cover members and common portions of the internal surfaces of the first and second walls, the tunnel communicating at one end with a first bee access and at the other end with a second bee access and gate means having a first operative position in which bees can move in either direction through the tunnel and a second operative position in which bees can move in only one direction through the tunnel.

The first bee access according to the second aspect of the invention may be an aperture bounded by the free end of the first cover member, the fourth wall and the parts of the first and second walls extending therebetween.

The second bee access according to the second aspect of the invention may be an aperture bounded by the free end of the second cover member, the third wall and the parts of the first and second walls extending therebetween. Preferably the bee escape is arranged such that, in use in a beehive, the first and second cover members form the top and bottom respectively of the box and the gate means is so arranged that when it is in its second operative position bees can move from the first access through the tunnel and down through the second access towards the brood chamber.

A queen excluder may be provided to prevent a queen bee from entering said tunnel. The queen excluder may be arranged to cover said second access and may be provided as a separate or integral extension to said second cover member.

The gate means may comprise a pivotally-mounted resilient member pivotable from a first, open position to a second position wherein it closes the tunnel in such a manner that, in use, a bee crawling along the second cover member in a direction towards the second access can deflect it out of its path.

The resilient gate member may comprise a strip of resilient material pivotally mounted at one longitudinal edge so that in the second position its free longitudinal edge is directed towards the second cover member and the angle between it and the second cover member facing the first access is an acute angle.

The resilient gate member may be pivotally supported along its longitudinal axis with an extension protruding through one of said first and second wall members whereby the gate means may be operated externally.

The strip of resilient material may be provided with a plurality of transverse slits extending inwardly from the free edge. Thus the strip comprises a plurality of tongues of which only one, or two, tongues need to be deflected by a bee. A convenient width for each tongue is between about ⅛ and 3/16 inch.

The resilient material is preferably a plastic material.

The various parts of the bee escape and bee excluder are preferably made of a plastic material but could be made of wood or metal.

Further, according to the invention there is provided a clearer board embodying a bee escape according to the invention.

Further, according to the invention there is provided a beehive including a clearer board according to the invention.

DESCRIPTION OF THE DRAWINGS

The invention will now be described by way of example with reference to the accompanying drawings in which, FIG. 1 is a perspective view from above of an embodiment of a clearer board including a bee escape with queen excluder according to the invention;

FIG. 2 is a side elevation of the clearer board of FIG. 1 taken on the line II—II;

FIG. 3 is an exploded perspective view of a beehive including the clearer board of FIG. 1;

DETAILED DESCRIPTION OF THE INVENTION

Figure 4:
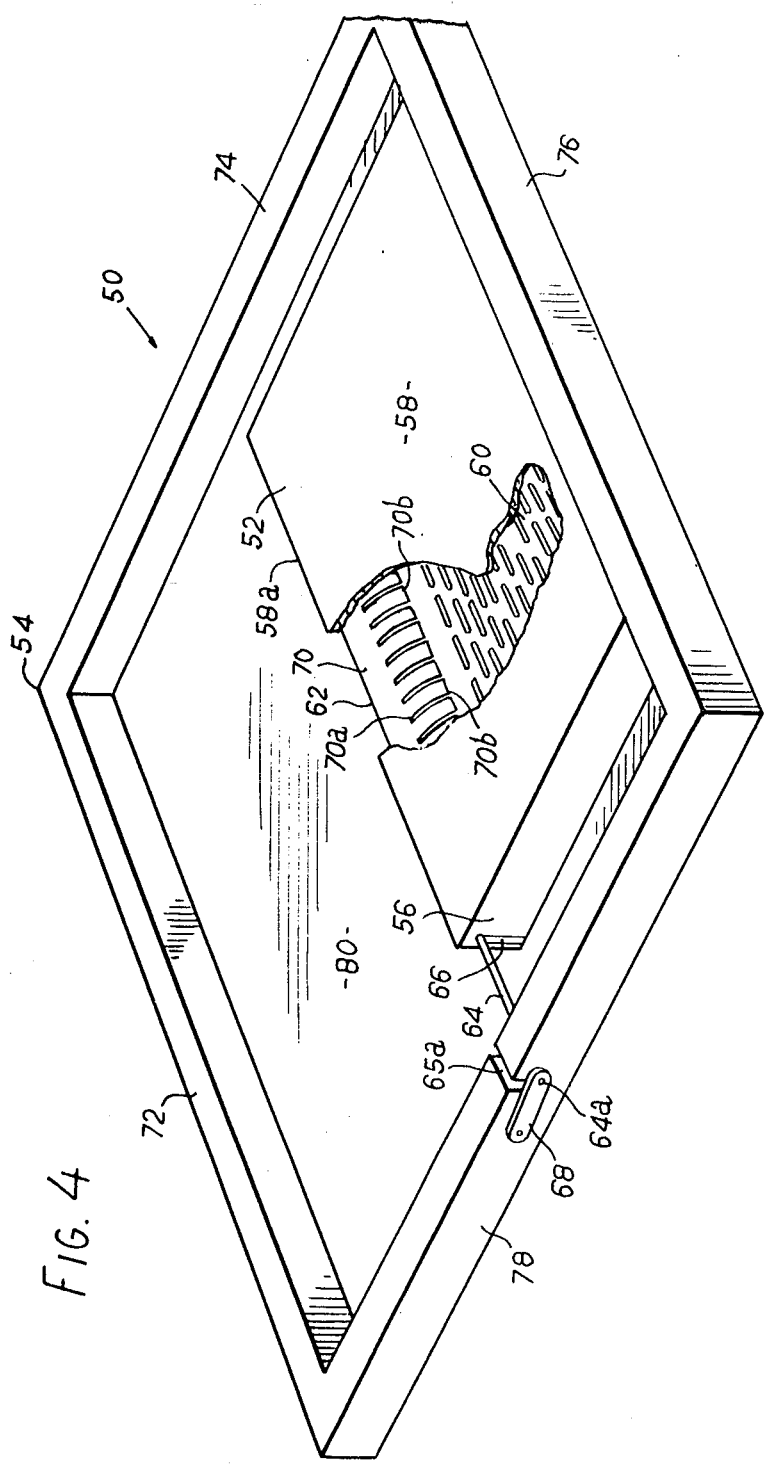
FIG. 4 is a perspective view from above of another embodiment of a clearer board and bee escape with queen excluder according to the invention.

Referring to FIGS. 1 to 3, there is shown a clearer board and bee escape 10 comprising a shallow box-like structure 12 about 18 inches square and having opposed first and second walls 12a, 12b joined by opposed third and fourth walls 12c, 12d. A first cover or top, member 14 extends between the upper edge portions of the first and second walls 12a, 12b and from the third wall 12c towards the fourth wall 12d a distance of about 8 inches. Part of the cover 14 and walls 12b and 12c are shown cut away to show a second cover, or base, member 16 which extends between lower edge portions of the first and second walls 12a, 12b and from the fourth wall 12d towards the third wall 12c a distance of about 11 inches in imperforate form and then continues to the third wall but perforated with apertures 17. The apertured section of cover 16 acts as a queen excluder 19. Thus the top and base members 14 and 16 respectively are fixed in spaced, parallel relation, the distance between their internal surface planes being about one half inch and the free edge 14a of member 14 overlaps the imperforate part of member 16 a distance of about one inch to define with parts of the internal surfaces of walls 12a and 12b a tunnel 20.

The base member 16 could terminate along the line defining the first row of apertures 17a to define a large aperture bounded by the said line, the wall 12c and the portions of the walls 12a and 12b extending therebetween. This large aperture could be left open or could be covered by a separate queen excluder.

The tunnel 20 communicates at one end with a first bee access 22 which is the aperture defined by the free edge 14a of the cover member 14, the wall 12d and the portions of walls 12a and 12b extending therebetween.

The tunnel 20 communicates at its other end with a second bee access which in the embodiment is the queen excluder 19.

A gate 24 is provided to close the tunnel 20 in a direction through the tunnel from the queen excluder 19 to the first bee access aperture 22. The gate 24 comprises an elongate member 26 broken in the middle having one end arranged to be rotatably mounted in an aperture (not shown) in the side wall 12a and another end 26a arranged to protrude through an aperture in the wall 12b where it terminates in an operating lever 28 (shown only in phartom in FIG. 2). Firmly secured to the member 26 is a strip 30 of a resilient plastic material, such as polyvinyl chloride-pvc, having a plurality of slits 30a extending inwardly from the free edge 30b thereof so that the strip 30 resembles a floppy comb. The length and width of each transverse strip between adjacent slits is about ⅞ inch and about ½ to 3/16 inch respectively.

The gate 24 is so mounted on the box 12 near the upper edges of the walls 12a, 12b, that the free end 30b of the resilient strip 30 extends into the tunnel 20 and the rod 26 can be pivoted by means of lever 28 from an open position wherein the strip 30 is substantially parallel to the cover member 14 to a closed position wherein the free end of the strip 30 is directed downwardly towards and just touches the cover member 16. The angle formed between the strip 30 and the bottom cover member 16 is an acute angle in a direction along the tunnel 20 away from the queen excluder 19. Thus, in use, in the open position a bee could pass freely along the tunnel 20 in either direction between the first access 22 and the second access 19 but in the closed position a bee could crawl along the inner surface of bottom wall 16 in a direction towards the queen excluder 19 and when it meets an individual transverse strip of the strip 30 the transverse strip would be deflected upwardly and allow the bee to pass to the queen excluder 19 and then down towards the exit of the hive in use. However, a bee attempting to crawl in the other direction would meet and tend to crawl up the resilient strip 30 which would then prevent its passage; the bee would then tend to retrace its steps and exit through the queen excluder. Thus the gate 30 is an effective one-way device when in its closed position. The bee escape and clearer board 10 may be made of a suitable material such as wood or wood and hardboard but is preferably made of plastic material.

Referring now to FIG. 3 there is shown a beehive 32 including a clearer board 10 as described with reference to FIGS. 1 and 2. The hive 32 comprises a floor 34, a brood box 36, a queen excluder 38, shallow boxes or supers 40, 42, a crown board 44 and a roof 46; an entrance 48 for the bees being provided between the floor 34 and brood box 36. Further shallows or supers may be provided between the shallow box 42 and crown board 44.

Between the shallow boxes 40 and 42, is provided a clearer board 10, although it will be realised that a clearer board could be positioned between the brood box 36 and shallow 40 in which case the queen excluder 38 could be dispensed with or retained below the clearer board.

In use, the gate 24 of the clearer board 10 is opened so that bees can pass freely up and down through the hive 32. When it is desired to remove the shallow box 42 to extract the honey therefrom the rod 26 is rotating the lever 28 counterclockwise to the position shown in FIG. 1 to close the gate 24 thus allowing bees to pass down from the shallow box 42 to the lower part of the hive 32 but preventing bees from entering shallow box 42. Two small holes, of which one hole 29 is shown in FIG. 1 are arranged to accommodate a locking member 28a extending from lever 28. In use, the lever 28 is pulled outwardly from wall 12b then rotated then pushed inwardly to locate member 28a in an aperture 29 to lock the gate 24 open or closed. When it is estimated that all or substantially all of the bees have left the shallow box 42 it can be removed from the hive and the honey subsequently removed from the combs on the frames (not shown) mounted therein.

It has been found that by using a clearer board according to the invention, which allows a relatively large number of bees to pass down through the bee escape at the same time, it is possible to clear the shallow box or boxes above it in a relatively short time, on average about two hours, whereas when using a conventional clearer board it usually takes about two days. This saves time and improves productivity particularly when a plurality of hives situated remotely from each other have to be serviced.

A spacing device, such as a perforated pegboard with or without thickened peripheral edges, or a shallow, hollow box open at the top and bottom, may be positioned below the clearer board 10 to assist the free-circulation of air under the board 10.

Referring to FIG. 4 of the drawings, there is shown a clearer board 50 including a bee escape 52 mounted in a shallow open-topped box 54. The bee escape 52 is in the form of a shallow box having first and second opposed side walls of which one 56 only is shown respectively joined at one end by a third side wall (not shown). A top cover member 58, shown partly cut-away, closes the top of the box 52 and a bottom cover member 60 extends between corresponding portions of the lower edges of the opposed side wall members 56 as shown to define a tunnel. The bottom cover member 60 is apertured to form a queen excluder. The end of the tunnel bounded by the edges of the side walls 56 and corresponding free edges 58a of the top cover member and of the lower cover member 60 remote from the third side wall define a first bee access to and from the tunnel and the perforations in the queen excluder define a second access.

A gate 62 is provided to close the tunnel to movement of bees in a direction through the tunnel from the queen excluder to the first access. The gate 62 comprises a rigid rod member 64 having one end arranged to be fitted rotatably in an aperture in the side wall of escape 52 opposed to the wall 56 and the other end arranged to be mounted in a slot 66 in the wall 56. A control lever 68 fixedly secured to the rod 64 is provided to rotate the rod 64 to open and close the gate 62. Firmly secured to the rod member 64 is a strip 70 of a resilient plastic material, such as polyvinyl chloride, having a plurality of slits 70a extending inwardly from the free edge 70b thereof so that the strip 70 resembles a floppy comb. The width of each strip between adjacent slits is about ⅛ to 3/16 of an inch.

The gate 62 is so mounted on the box 52 that the free end 70b of the resilient strip 70 extends into the tunnel and the rod 64 can be pivoted from an open position by lever 68 wherein the strip 70 is substantially parallel to the cover member 58 to a closed position wherein the free end of the strip 70 is directed downwardly towards and just touches the cover member 60. The angle formed between the strip 70 and the bottom cover member 60 is an acute angle in a direction along the tunnel away from the queen excluder 60. Thus, in use, in the open position a bee could pass freely along the tunnel in either direction between the first access and the second access but in the closed position a bee could crawl along the inner surface of bottom wall 80 in a direction towards the bee excluder 60 and when it meets an individual transverse strip of the strip 70 the transverse strip would be deflected upwardly and allow the bee to pass to the queen excluder 60. However, a bee attempting to crawl in the other direction would meet and tend to crawl up the resilient strip 70 which would thus prevent its passage; the bee would then tend to retrace its steps and exit through the queen excluder. Thus the gate 62 is an effective one-way device when in its closed position. The bee escape 52 may be made of a suitable material such as wood or wood and hardboard but is preferably made of plastic material.

The bee escape is mounted in a shallow, open-topped box 54 comprising side walls 72, 74, 76, 78 and a base wall 80. The end 64a of the rod member 64 is directed through a slot 65a in wall 78 so that it extends to the outside thereof so that the bee escape 52 is held loosely in position in the box 54. The third wall of the bee escape 52 extends slightly beyond the wall 56 and fits into lugs on the inside surface of wall 76 to maintain it in the position shown in FIG. 4. An aperture is formed in the bottom wall 80 in a position which corresponds with that of the queen excluder 60 when the bee escape 52 is mounted in the box 54. The gate 70 can be operated externally by rotation of the lever 68 of the rod 64. The box 54 can be made of any suitable material such as wood, wood and hardboard or plastics material.

We claim:

1. A bee escape comprising a shallow box having opposed first and second side walls joined at or near one end by a third side wall, a first cover member extending between corresponding first edges of the side walls and from the third wall and a second cover member extending between corresponding first portions of the second edges of said first and second walls and spaced from the third wall to define a tunnel between the internal surfaces of the overlapping parts of said cover members and said first and second side walls, the tunnel communicating at one end with a first bee access and at the other end with a second bee access and gate means having a first operative position wherein bees can move in either direction between the first and second accesses through the tunnel and a second operative position wherein bees can move in only one direction between the first and second access.

2. A bee escape according to claim 1, in which the first bee access is an aperture bounded by the other ends of said first and second wall members and corresponding edges of the first and second cover members remote from said third wall member.

3. A bee escape according to claim 1 or 2, in which the second access is an aperture bounded by the third wall and the edge of the second cover member facing the third wall and corresponding portions of the second edges of said first and second walls between the second cover member and the third wall.

4. A bee escape according to claims 1 or 2, in which the first and second side walls are joined at their other ends by a fourth wall and the edge of the first cover member remote from the third wall is spaced from said fourth wall and the edge of the second cover member remote from the third wall extends from said fourth wall.

5. A bee escape according to claim 4, in which the shallow box is dimensioned to act as a clearer board.

6. A bee escape according to claims 1 or 2, in which the three sided shallow box is arranged to fit into a larger box having four sides and a base with an aperture formed therein as an extension of the second bee access, the arrangement forming a clearer board.

7. A bee escape comprising a shallow box-like structure having opposed first and second side walls,
a first cover member extending between corresponding portions of said first and second walls,
a second cover member extending between corresponding portions of said first and second walls,
the cover members being arranged in spaced relation with portions including an overlapping free edge of the first cover member and an overlapping boundary of the second cover member defining a tunnel between the internal surfaces of the overlapping portions of the cover members and common portions of the internal surfaces of the first and second walls, the tunnel communicating at one end with a first bee access and at the other end with a second bee access and gate means having a first operative position in which bees can move in either direction through the tunnel and a second operative position in which bees can move in only one direction through the tunnel.

8. A bee escape according to claim 7, in which the first bee access is an aperture bounded on one side by the overlapping free edge of the first cover member.

9. A bee escape according to claim 7 or 8, in which the second bee access is an aperture bounded on one side by the overlapping boundary of the second cover member.

10. A bee escape according to claim 9, arranged such that, in use in a beehive, the first and second cover members form the top and bottom respectively of the box and the gate means is so arranged that when it is in its second operative position bees can move from the first access through the tunnel and down through the second access towards the brood chamber.

11. A bee escape according to claims 7 or 8 in which, a queen excluder is provided to prevent a queen bee from entering said tunnel.

12. A bee escape according to claim 11, in which the queen excluder is arranged to cover said second access.

13. A bee escape according to claim 12 in which, the queen excluder is provided as a separate extension to said second cover member.

14. A bee escape according to claim 12, in which said queen excluder is an integral part of said second cover member.

15. A bee escape according to claims 7 or 8, in which the gate means comprises a pivotally-mounted resilient member pivotable from a first, open position to a second position wherein it closes the tunnel in such a manner that, in use, a bee crawling along the second cover member in a direction towards the second access can deflect it out of its path.

16. A bee escape according to claim 15, in which the resilient gate member comprises a strip of resilient material pivotally mounted at one longitudinal edge so that in the second position its free longitudinal edge is directed towards the second cover member and the angle between it and the second cover member facing the first access is an acute angle.

17. A bee escape according to claim 16 in which the strip of resilient material is provided with a plurality of transverse slits extending inwardly from the free edge.

18. A bee escape according to claim 17, in which the resilient material is a plastic material.

19. A bee escape according to claim 15, in which the resilient gate member is pivotally supported along its longitudinal axis with an extension protruding through one of said first and second wall members whereby the gate means may be operated externally.

20. A bee escape according to claims 7 or 8 wherein the bee escape is made of a plastic material.

21. A bee escape for use in combination with a clearer board comprising a shallow box-like structure having opposed first and second side walls,
a first cover member extending between corresponding portions of said first and second walls,
a second cover member extending between corresponding portions of said first and second walls,
the cover members being arranged in spaced relation with portions including the overlapping free edge of the first cover member and an overlapping boundary of the second cover member defining a tunnel between the internal surfaces of the overlapping portions of the cover members and common portions of the internal surfaces of the first and second walls, the tunnel communicating at one end with a first bee access and at the other end with a second bee access and gate means having a first operative position in which bees can move in either direction through the tunnel and a second operative position in which bees can move in only one direction through the tunnel.

22. A bee escape for use in a beehive comprising a shallow box-like structure having opposed first and second side walls,
a first cover member extending between corresponding portions of said first and second walls,
a second cover member extending between corresponding portions of said first and second walls,
the cover members being arranged in spaced relation with portions including an overlapping free edge of the first cover member and an overlapping boundary of the second cover member defining a tunnel between the internal surfaces of the overlapping portions of the cover members and common portions of the internal surfaces of the first and second walls, the tunnel communicating at one end with a first bee access and at the other end with a second bee access and gate means having a first operative position in which bees can move in either direction through the tunnel and a second operative position in which bees can move in only one direction through the tunnel.

23. A bee escape for use in combination with a clearer board comprising a shallow box having opposed first and second side walls joined at or near one end by a third side wall, a first cover member extending between corresponding first edges of the side walls and from the third wall and a second cover member extending between corresponding first portions of the second edges of said first and second walls and spaced from the third wall to define a tunnel between the internal surfaces of the overlapping parts of said cover members and said first and second side walls, the tunnel communicating at one end with a first bee access and at the other end with a second bee access and gate means having a first operative position wherein bees can move in either direction between the first and second accesses through the tunnel and a second operative position wherein bees can move in only one direction between the first and second access.

24. A bee escape for use in a beehive comprising a shallow box having opposed first and second side walls joined at or near one end by a third side wall, a first cover member extending between corresponding first edges of the side walls and from the third wall and a second cover member extending between corresponding first portions of the second edges of said first and second walls and spaced from the third wall to define a tunnel between the internal surface of the overlapping parts of said cover members and said first and second side walls, the tunnel communicating at one end with a first bee access and at the other end with a second bee access and gate means having a first operative position wherein bees can move in either direction between the first and second accesses through the tunnel and a second operative position wherein bees can move in only one direction between the first and second access.

* * * * *